(12) United States Patent
Jo

(10) Patent No.: US 12,734,988 B2
(45) Date of Patent: Sep. 15, 2026

(54) METHOD AND STRUCTURE FOR FIXING CURTAIN AIRBAG

(71) Applicant: HYUNDAI MOBIS CO., LTD., Seoul (KR)

(72) Inventor: Kum Ho Jo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 19/203,430

(22) Filed: May 9, 2025

(65) Prior Publication Data

US 2026/0034956 A1 Feb. 5, 2026

(30) Foreign Application Priority Data

Aug. 1, 2024 (KR) ........................ 10-2024-0102598

(51) Int. Cl.
*B60R 21/213* (2011.01)
*B60R 21/232* (2011.01)

(52) U.S. Cl.
CPC .......... *B60R 21/213* (2013.01); *B60R 21/232* (2013.01)

(58) Field of Classification Search
CPC .............. B60R 21/213; B60R 21/2171; B60R 21/232
See application file for complete search history.

(56) References Cited

U.S. PATENT DOCUMENTS

| | | | | |
|---|---|---|---|---|
| 6,722,693 B2 * | 4/2004 | Ikeda | B60R 21/201 | 280/730.2 |
| 7,077,424 B2 * | 7/2006 | Inoue | B60R 21/26 | 280/730.2 |
| 7,077,425 B2 * | 7/2006 | Ogawa | B60R 21/213 | 280/730.2 |
| 7,080,853 B2 * | 7/2006 | Ogata | B60R 21/2338 | 280/730.2 |
| 7,407,182 B2 * | 8/2008 | Aoki | B60R 21/201 | 280/730.2 |
| 7,862,075 B2 * | 1/2011 | Minamikawa | B60R 21/217 | 280/728.2 |
| 7,976,055 B2 * | 7/2011 | Son | B60R 21/213 | 280/730.2 |
| 8,006,999 B2 * | 8/2011 | Suemitsu | B60R 21/235 | 280/730.2 |
| 8,876,150 B2 * | 11/2014 | Min | B60R 21/213 | 280/730.2 |
| 2006/0108778 A1 * | 5/2006 | Ochiai | B60R 21/232 | 280/730.2 |

* cited by examiner

*Primary Examiner* — Laura Freedman
(74) *Attorney, Agent, or Firm* — NSIP Law

(57) ABSTRACT

A curtain airbag fixing structure includes: an inflator bracket coupled with an inflator; a bracket fixing tab fixed to an airbag cushion, which is near the inflator; and a mounting portion mounted on an overlapping portion that corresponds to where a part of the inflator bracket and a part of the bracket fixing tab overlap each other.

8 Claims, 4 Drawing Sheets

METHOD AND STRUCTURE FOR FIXING CURTAIN AIRBAG

CROSS REFERENCE TO RELATED APPLICATION

The present application claims priority to Korean Patent Application No. 10-2024-0102598, filed Aug. 1, 2024, the entire contents of which is incorporated herein for all purposes by this reference.

BACKGROUND

Field of the Invention

The present disclosure relates to a structure and method for fixing a curtain airbag, designed to facilitate airbag assembly by improving the mounting structure of an airbag cushion.

Description of the Related Art

In recent years, there has been a growing trend of equipping vehicles not only with airbags installed in front of the driver's and passenger seats but also with side airbags deploying from the sides of the seats along with curtain airbags extending along the windows to protect against side collisions.

The curtain airbag is provided with an airbag cushion extending from front to rear, and an inflator is installed to supply gas into the airbag cushion.

In addition, mounting tabs are intermittently fixed to the airbag cushion in the longitudinal direction, and each mounting tab is fixed to the vehicle body so that the airbag cushion is fixed to the vehicle body.

In addition, the inflator is connected to an inlet formed in the airbag cushion so that the gas generated by the inflator is supplied into the airbag cushion through the inlet.

However, the mounting tab cannot be applied to the inflator area and thus cannot secure the airbag cushion part deploying near the inflator.

Therefore, there is a concern that the airbag cushion may deploy with a delay to compromise deployment performance, and the trim surrounding the airbag cushion may be damaged when the airbag cushion deploys.

The matters described above as background technology are intended to facilitate a better understanding of the background of the present disclosure and do not constitute an admission that the present disclosure pertains to the conventional technology already known to those skilled in the art.

SUMMARY

An object of the present disclosure, proposed to address the abovementioned issues, is to provide a structure and method for fixing a curtain airbag, designed to improve the deployment performance of an airbag cushion by supporting the airbag cushion near the inflator.

The technical issues that the present disclosure intends to address are not limited to the issues mentioned above, and other unmentioned issues will be clearly understood by those skilled in the art to which the present disclosure pertains from the following description.

A curtain airbag fixing structure according to the present disclosure for achieving the abovementioned object includes an inflator bracket coupled with an inflator; a bracket fixing tab fixed to an airbag cushion, which is near the inflator; and a mounting portion mounted on an overlapping portion that corresponds to where a part of the inflator bracket and a part of the bracket fixing tab overlap each other.

The inflator bracket may include a downward first fixing portion; the bracket fixing tab may include an upward second fixing portion; and the first fixing portion and the second fixing portion may be mounted by the mounting portion.

A plurality of first fixing portions may be disposed within the length range of the inflator and the second fixing portion may be disposed directly below the first fixing portion.

The first fixing portion and the second fixing portion may be mounted at the front end portion and rear end portion of the inflator, respectively.

A tensile strength of the second fixing portion disposed closer to an outlet of the inflator may be greater than a tensile strength of a remaining portion of the second fixing portion.

The first mounting hole and the second mounting hole may be disposed in the first fixing portion and the second fixing portion, respectively, and the mounting portion may pass through the first mounting hole and the second mounting hole and be mounted in a state in which the first mounting hole and the second mounting hole are aligned.

The second fixing portion may overlap the first fixing portion on the vehicle's inner side of the first fixing portion.

The mounting portion may be mounted by a bolt fastening method.

In the mounting portion, a bolt may pass through the overlapping portion of the inflator bracket and the bracket fixing tab and a retainer may be fastened to the bolt.

A curtain airbag fixing method according to the present disclosure includes coupling an inflator bracket with an inflator; fixing a bracket fixing tab to an airbag cushion near the inflator; and mounting a mounting portion on an overlapping portion in which a part of the inflator bracket and a part of the bracket fixing tab overlap each other.

According to the present disclosure, the inflator bracket and the airbag cushion positioned under the inflator bracket may be connected using a bracket fixing tab so that the airbag cushion under the inflator is secured.

As a result, vibration and rotation of the part of the airbag cushion near the inflator are prevented during curtain airbag deployment so that the airbag cushion deploys downward in a stable manner. This offers the effect of enhancing the deployment performance of the curtain airbag and the advantage of preventing damage to the vehicle structure (trim) around the curtain airbag.

The effects obtainable from the present disclosure are not limited to the effects mentioned above, and other unmentioned effects will be clearly understood by those skilled in the art to which the present disclosure pertains from the following description.

DETAILED DESCRIPTION

Figure 1:
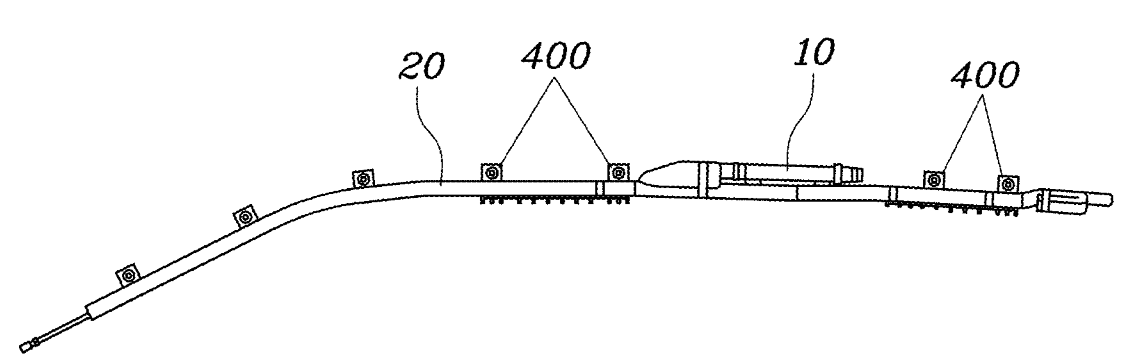
FIG. 1 is a view illustrating an installation state of a curtain airbag according to an embodiment of the present disclosure.

When it is determined that a specific description of the related and already known technology may obscure the essence of the embodiments disclosed herein, the specific description will be omitted. Further, it is to be understood that the accompanying drawings are only intended to facilitate understanding of the embodiments disclosed herein and are not intended to limit the technical ideas disclosed herein are not limited to the accompanying drawings and include all the modifications, equivalents, or substitutions within the spirit and technical scope of the present disclosure.

The terms including ordinal numbers such as first, second, and the like may be used to describe various components, but the components are not to be limited by the terms. The terms may only be used for the purpose of distinguishing one component from another.

Singular expressions include plural expressions unless the context explicitly indicates otherwise.

In the present specification, terms such as "comprise" or "have" are intended to indicate the presence of implemented features, numbers, steps, motions, components, parts, or combinations thereof described in the specification and are not to be understood to preclude the presence or additional possibilities of one or more of other features, numbers, steps, motions, components, parts or combinations thereof.

The suffixes "module" and "unit" used for components in the following description are assigned or used interchangeably only in consideration of facilitating the preparation of the specification and are not intended to have distinct meanings or roles in and of themselves.

It is to be understood that when one component is referred to as being "connected" or "linked" to another component, the component may be directly connected or linked but there may be other components in between. In contrast, when one component is referred to as being "directly connected" or "directly linked" to another component, it is to be understood that there is no other component in between.

Hereinafter, embodiments disclosed in the present specification will be described in detail with reference to the accompanying drawings. Identical or similar components are assigned the same reference numerals regardless of drawing designation, and repetitive descriptions thereof will be omitted.

A curtain airbag fixing structure according to the present disclosure includes an inflator bracket 100 coupled with an inflator 10; a bracket fixing tab 200 fixed to an airbag cushion 20 near the inflator 10; and a mounting means 300 mounted on an overlapping portion in the state where a part of the inflator bracket 100 and a part of the bracket fixing tab 200 overlap each other in the overlapping portion.

For example, the curtain airbag according to an embodiment of the present disclosure features the airbag cushion 20 installed above the door on the vehicle's inner side, extending from front to rear and folded into a roll shape.

The lower end portion of the mounting tab 400 made of fabric (e.g., cotton) is fixed to the airbag cushion 20 at predetermined intervals in the length direction and the upper end portion of the mounting tab 400 is fixed to the vehicle body so that the airbag cushion 20 folded into a roll is fixed to the vehicle body.

In addition, the inflator 10 is installed in the middle portion of the airbag cushion 20 over the entire length of the airbag cushion 20, a diffuser is fixed to an inlet of the airbag cushion 20, and the diffuser is connected to the inflator 10 to introduce the gas discharged from the inflator 10 into the airbag cushion 20 through the diffuser so that the airbag cushion 20 expands to deploy downward.

In addition, the inflator bracket 100 is assembled on one side of the outer surface of the inflator 10 in the shape that covers the inflator 10.

The inflator bracket 100 is made of a hard material such as steel or metal and has an arc-shaped cross-section that matches the curvature of the outer circumference of the inflator.

One end portion of the rectangular bracket fixing tab 200 made of fabric material (e.g., cotton) is fixed to the airbag cushion 20, separate from the aforementioned mounting tab 400.

It is to be noted that the bracket fixing tab 200 may be made of the same material as the airbag cushion 20 and be sewn to the airbag cushion 20 or integrally formed with the airbag cushion 20.

In particular, a part of the inflator bracket 100 formed toward the bracket fixing tab 200 and a part of the bracket fixing tab 200 formed toward the inflator bracket 100 overlap each other and the overlapping portion is mounted by the mounting means 300 so that the airbag cushion 20 near the inflator 10 is secured by the bracket fixing tab 200.

In other words, when the part of the airbag cushion 20 near the inflator 10 is not firmly secured, the part of the airbag cushion 20 may deploy while vibrating and rotating by the discharging force of the gas from the inflator 10 and thus deploy in a direction other than downward while twisting to one side. As a result, the deployment of the entire airbag cushion 20 may be delayed or the vehicle structure (trim, etc.) around the curtain airbag may be damaged.

Therefore, the present disclosure secures the airbag cushion 20 near the inflator 10 with the bracket fixing tab 200 so that vibration and rotation of the part of the airbag cushion 20 near the inflator 10 are prevented, thus the airbag cushion 20 deploys downward in a stable manner. This enhances the deployment performance of the curtain airbag and prevents damage to the vehicle structure (trim) around the curtain airbag.

Figure 3:
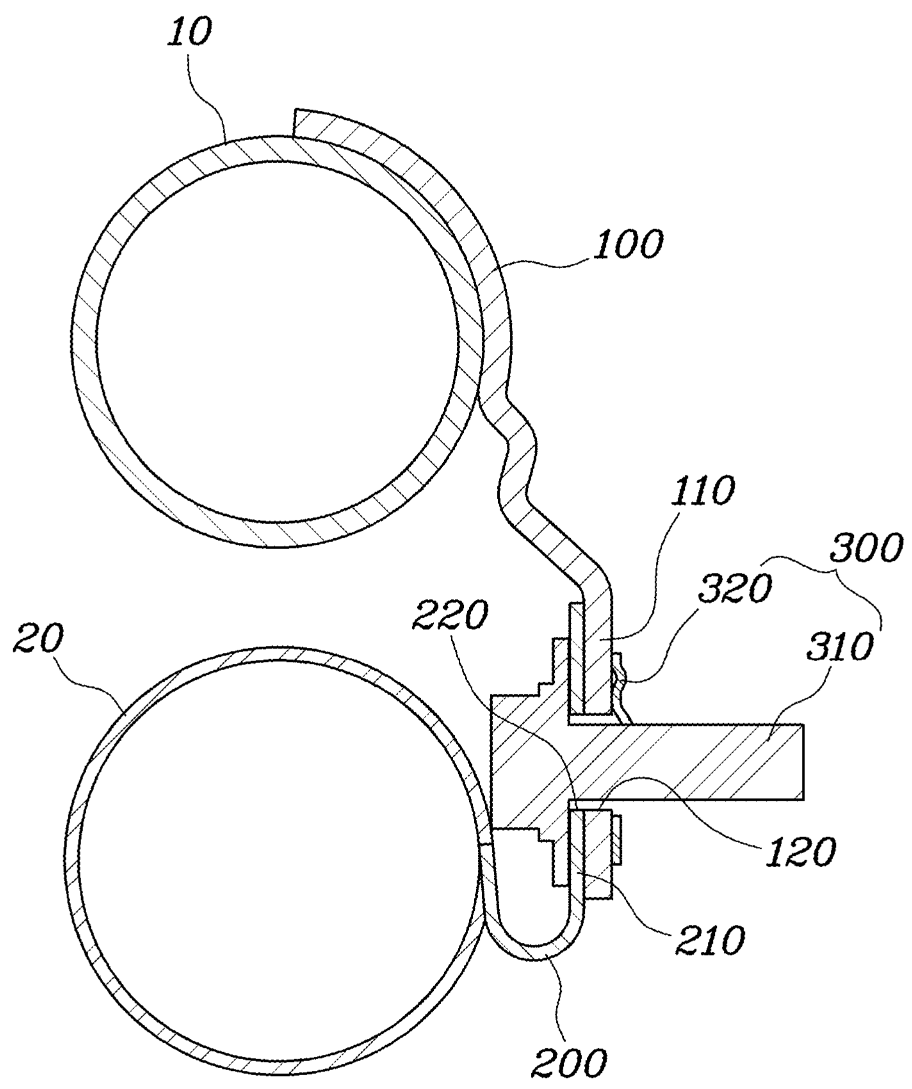
FIG. 3 is a cross-sectional view taken along A-A in FIG. 2.
Figure 4:
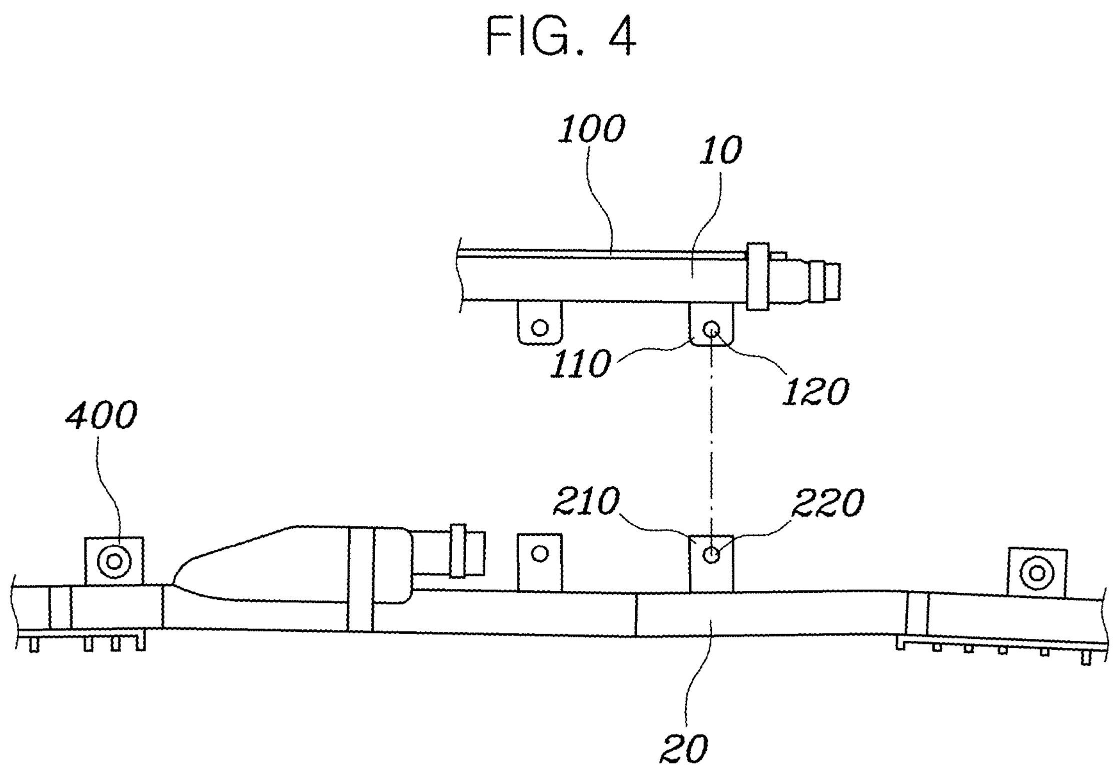
FIG. 4 is a view illustrating an inflator bracket and bracket fixing tab in a separated state according to the present disclosure.

In addition, as illustrated in FIGS. 3 and 4, the inflator bracket 100 is provided with a downward first fixing portion 110; the bracket fixing tab 200 is provided with an upward second fixing portion 210; and the first fixing portion 110 and the second fixing portion 210 may overlap each other so that a mounting means 300 may be mounted.

For example, the first fixing portion 110 is integrally formed with the inflator bracket 100 in a part of the lower end portion of the inflator bracket 100. The first fixing portion 110 is rectangular plate-shaped and extends downward toward the second fixing portion 210.

The second fixing portion 210 is a part of the bracket fixing tab 200 and is made of the same fabric material as the bracket fixing tab 200.

The second fixing portion 210 is formed at the other end portion of the bracket fixing tab 200 and is raised upward toward the first fixing portion 110 to overlap the first fixing portion 110.

Accordingly, in the state where the first fixing portion 110 and the second fixing portion 210 overlap, the mounting means 300 passes through the first fixing portion 110 and the second fixing portion 210 for fastening so that the first fixing portion 110 and the second fixing portion 210 are fixed to each other.

Figure 2:
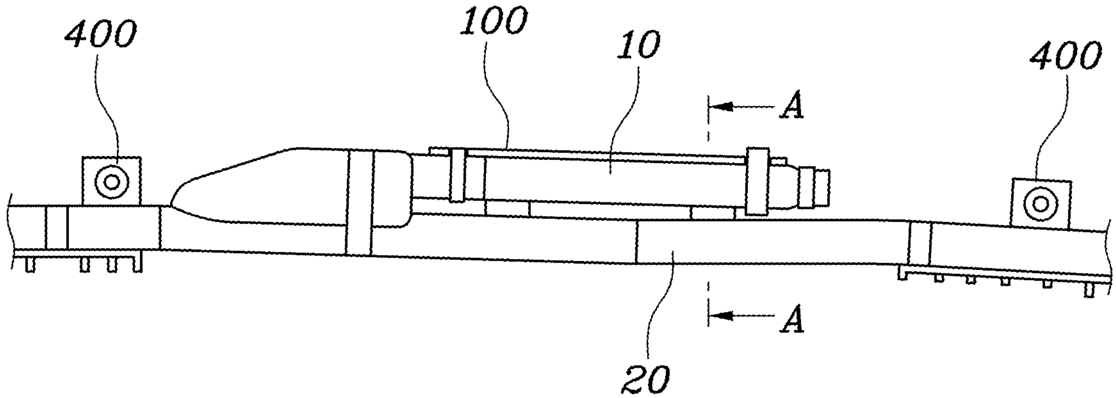
FIG. 2 is an enlarged view of the inflator in FIG. 1.

In addition, as illustrated in FIGS. 2 and 4, a plurality of first fixing portions 110 may be provided within the length range of the inflator 10 and the second fixing portion 210 may be provided directly below the first fixing portion 110.

For example, the first fixing portion 110 and the second fixing portion 210 may be mounted on at the front end portion and the rear end portion of the inflator 10 respectively.

Of course, at least one of the first fixing portions 110 and the second fixing portions 210 may be additionally mounted between the front end portion and the rear end portion of the inflator 10.

In other words, the first fixing portion 110 and the second fixing portion 210 connecting the inflator 10 and the airbag cushion 20 are mounted at the shortest distance between them and the first fixing portion 110 and the second fixing portion 210 are mounted at two mounting points or more so that the airbag cushion 20 positioned under the inflator 10 is more firmly secured in a stable manner to enhance the downward deployment performance of the airbag cushion 20.

Further, the second fixing portion 210 closer to an outlet of the inflator 10 may have greater tensile strength.

For example, a second fixing portion 210 near the outlet of the inflator 10 may be made of a material having greater tensile strength than the other second fixing portion 210 to increase its tensile strength, and several layers may be sewn together to increase the tensile strength.

In other words, the second fixing portion 210 is made of fabric material, so the second fixing portion 210 may be torn or damaged by the strong discharging pressure of the inflator 10.

Therefore, the second fixing portion 210 subjected to strong discharging pressure of the inflator 10 among the second fixing portions 210, may be formed with the greater tensile strength to ensure that damage to the second fixing portion 210 is prevented and the airbag cushion 20 positioned under the inflator 10 is secured in a stable manner.

Figure 5:
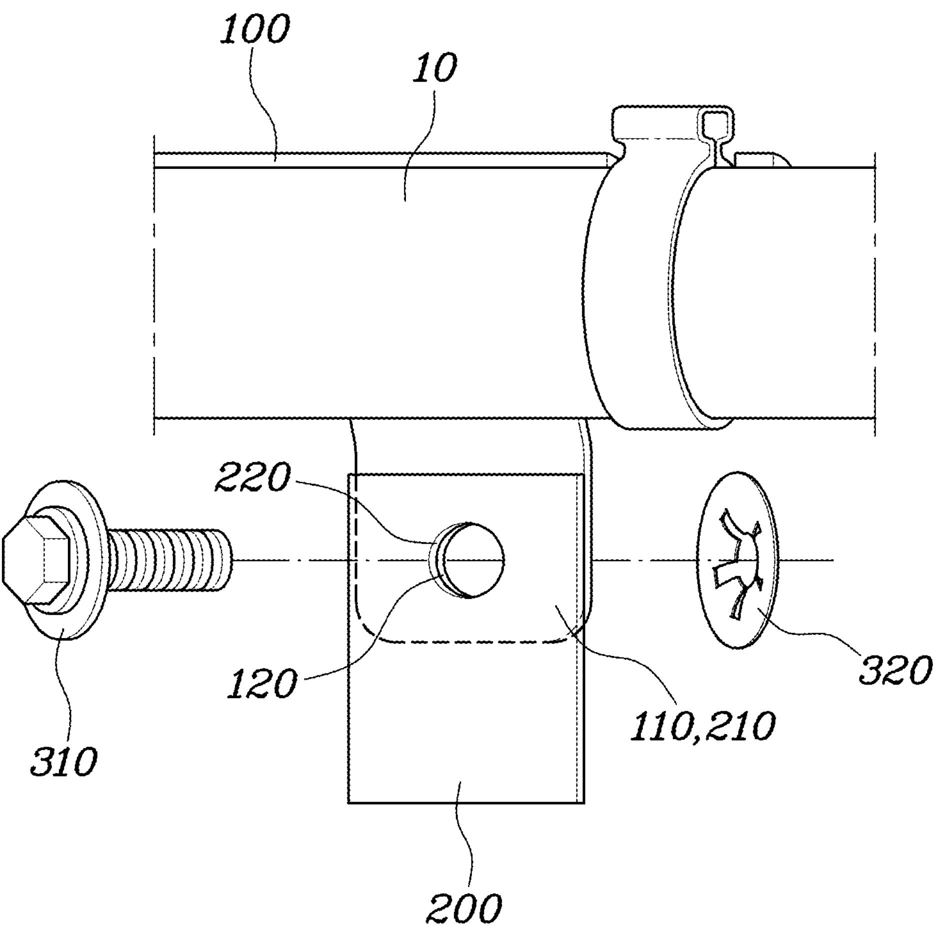
FIG. 5 is a view for describing a configuration for mounting an inflator bracket and a bracket fixing tab using a bolt and a retainer according to the present disclosure.

In addition, as illustrated in FIGS. 4 and 5, a first mounting hole 120 and a second mounting hole 220 are formed in the first fixing portion 110 and the second fixing portion 210 respectively, and the mounting means 300 may pass through the first mounting hole 120 and the second mounting hole 220 and be mounted in the state where the first mounting hole 120 and the second mounting hole 220 are aligned.

In other words, a circular first mounting hole 120 is formed in the first fixing portion 110 and a circular second mounting hole 220 matching the first mounting hole 120 in size is formed in the second fixing portion 210.

Then, in the state where the first fixing portion 110 and the second fixing portion 210 overlap each other such that the first mounting hole 120 and the second mounting hole 220 are aligned, the mounting means 300 passes through the first mounting hole 120 and the second mounting hole 220 to mount the first fixing portion 110 and the second fixing portion 210 onto each other.

In addition, as illustrated in FIG. 5, the second fixing portion 210 may overlap the first fixing portion 110 on the vehicle's inner side of the first fixing portion 110 in the present disclosure.

In other words, the highly rigid first fixing portion 110 faces the vehicle's outer side, and the second fixing portion 210 connected to the airbag cushion 20 faces the vehicle's inner side in the overlapping configuration.

Therefore, the first fixing portion 110 serves to prevent the airbag cushion 20 from deploying toward the outer side and induce the airbag cushion 20 to deploy toward the inner side early during deployment of the airbag cushion 20 so that the airbag cushion 20 deploys quickly while avoiding the interference from the door to protect passengers safely.

On the other hand, the mounting means 300 may be mounted by a bolt fastening method in the present disclosure.

Preferably, as illustrated in FIGS. 3 and 5, a bolt 310 passes through an overlapping portion of the inflator bracket 100 and the bracket fixing tab 200 and a retainer 320 is fastened to the bolt 310 so that the mounting means 300 may be mounted.

In other words, the body of the bolt 310 is inserted from the side of the first fixing portion 110 to the side of the second fixing portion 210 so that the body of the bolt 310 sequentially passes through the second mounting hole 220 and the first mounting hole 120.

In this state, the retainer 320 is inserted and fastened onto the body of the bolt 310 protruding from the first fixing portion 110 so that the first fixing portion 110 and the second fixing portion 210 are mounted in a pressed state between the head of the bolt 310 and the retainer 320.

On the other hand, a method of fixing a curtain airbag in the present disclosure includes coupling an inflator bracket 100 with an inflator 10; fixing a bracket fixing tab 200 to an airbag cushion 20 near the inflator 10; and mounting a mounting means 300 on an overlapping portion in the state where a part of the inflator bracket 100 and a part of the bracket fixing tab 200 overlap each other in the overlapping portion.

FIGS. 4 and 5 show that the inflator bracket 100 is assembled in a shape that covers the outer circumferential surface of the inflator 10.

Further, one end portion of the bracket fixing tab 200 is sewn to the uppermost end portion of the airbag cushion 20.

Then, the second fixing portion 210 formed at the other end portion of the bracket fixing tab 200 is overlaid onto the first fixing portion 110 formed in the inflator bracket 100 from under in the state where the airbag cushion 20 is folded into a roll.

At this time, the first mounting hole 120 formed in the first fixing portion 110 and the second mounting hole 220 formed in the second fixing portion 210 are aligned.

Then, the bolt 310 is inserted into the aligned first mounting hole 120 and second mounting hole 220, and the retainer 320 is fastened to the bolt 310 to fasten the first fixing portion 110 and the second fixing portion 210 together.

According to the aforementioned configuration, the inflator bracket 100 and the airbag cushion 20 formed under the inflator bracket 100 are connected using the bracket fixing tab 200 so that the airbag cushion 20 under the inflator 10 is secured.

As a result, vibration and rotation of the part of the airbag cushion 20 near the inflator 10 are prevented during curtain airbag deployment so that the airbag cushion 20 deploys downward in a stable manner to prevent damage to the vehicle structure (trim) around the curtain airbag as well as enhance deployment performance of the curtain airbag.

Specific embodiments of the present disclosure are illustrated and described, but it will be evident to those skilled in the art that the present disclosure may be improved upon and modified in various manners within the scope not deviating from the technical spirit of the present disclosure provided in the following patent claims.

What is claimed is:

1. A curtain airbag fixing structure, comprising:

an inflator bracket coupled with an inflator;

a bracket fixing tab fixed to an airbag cushion, which is near the inflator, the bracket fixing tab including at least a portion comprising a fabric material that is fixed to the airbag cushion; and a mounting portion mounted on an overlapping portion that corresponds to where a part of the inflator bracket and a part of the bracket fixing tab overlap each other, wherein the inflator bracket includes a plurality of downward first fixing portions, the bracket fixing tab includes a plurality of upward second fixing portions, and the first fixing portions and the second fixing portions overlap each other and are mounted by the mounting portion, the first fixing portions are mounted at a front end portion and a rear end portion of the inflator, respectively, within a length range of the inflator, and wherein a diffuser is provided between the inflator and an inlet of the airbag cushion to introduce gas discharged from the inflator into the airbag cushion through the diffuser.

2. The curtain airbag fixing structure of claim 1, wherein the second fixing portions are disposed directly below the first fixing portions.

3. The curtain airbag fixing structure of claim 1, wherein a tensile strength of the second fixing portions disposed closer to an outlet of the inflator is greater than a tensile strength of a remaining portion of the second fixing portions.

4. The curtain airbag fixing structure of claim 1, wherein a first mounting hole and a second mounting hole are disposed in one of the first fixing portions and the second fixing portions, respectively, and the mounting portion passes through the first mounting hole and the second mounting hole and is mounted in a state in which the first mounting hole and the second mounting hole are aligned.

5. The curtain airbag fixing structure of claim 1, wherein the second fixing portions overlap the first fixing portions on a vehicle's inner side of the first fixing portions.

6. The curtain airbag fixing structure of claim 1, wherein the mounting portion is mounted by a bolt fastening method.

7. The curtain airbag fixing structure of claim 1, wherein in the mounting portion, a bolt passes through a portion in which the inflator bracket and the bracket fixing tab overlap each other and a retainer is fastened to the bolt.

8. A curtain airbag fixing method comprising:

coupling an inflator bracket with an inflator;

fixing a bracket fixing tab to an airbag cushion near the inflator, the bracket fixing tab including at least a portion comprising a fabric material that is fixed to the airbag cushion; and mounting a mounting portion on an overlapping portion in which a part of the inflator bracket and a part of the bracket fixing tab overlap each other, wherein the inflator bracket includes a plurality of downward first fixing portions, the bracket fixing tab includes a plurality of upward second fixing portions, and the first fixing portions and the second fixing portions overlap each other and are mounted by the mounting portion, the first fixing portions are mounted at a front end portion and a rear end portion of the inflator, respectively, within a length range of the inflator, and wherein a diffuser is provided between the inflator and an inlet of the airbag cushion to introduce gas discharged from the inflator into the airbag cushion through the diffuser.

* * * * *